United States Patent
Somes et al.

(10) Patent No.: US 9,071,683 B1
(45) Date of Patent: Jun. 30, 2015

(54) METHODS AND SYSTEMS FOR DETERMINING WHETHER AN IDENTITY ASSOCIATED WITH A TELEPHONE CALL IS FAKE

(71) Applicant: Verizon Patent and Licensing Inc., Arlington, VA (US)

(72) Inventors: Brian Somes, Richardson, TX (US); Jeffrey Haltom, Fishers, IN (US); Thomas A. Gallant, Colorado Spings, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/262,470

(22) Filed: Apr. 25, 2014

(51) Int. Cl.
| | |
|---|---|
| *H04M 17/00* | (2006.01) |
| *H04M 15/00* | (2006.01) |
| *H04M 15/06* | (2006.01) |
| *H04M 3/42* | (2006.01) |
| *H04M 3/436* | (2006.01) |

(52) U.S. Cl.
CPC .......... *H04M 3/42059* (2013.01); *H04M 3/436* (2013.01)

(58) Field of Classification Search
CPC . H04L 12/585; H04W 12/12; G06Q 20/4016; G06Q 20/32; G06Q 40/00
USPC ............ 379/114.14, 142.04, 142.05, 142.06, 379/142.09, 142.17, 145, 245, 246, 247; 455/410, 411; 705/44, 325
See application file for complete search history.

(56) References Cited

U.S. PATENT DOCUMENTS

| | | | |
|---|---|---|---|
| 2006/0251068 A1* | 11/2006 | Judge et al. | 370/389 |
| 2007/0027807 A1* | 2/2007 | Bronstein | 705/44 |
| 2010/0130172 A1* | 5/2010 | Vendrow et al. | 455/411 |
| 2011/0131123 A1* | 6/2011 | Griffin et al. | 705/35 |
| 2011/0211682 A1* | 9/2011 | Singh et al. | 379/142.05 |
| 2012/0287823 A1* | 11/2012 | Lin | 370/259 |
| 2014/0192675 A1 | 7/2014 | Perez et al. | |

* cited by examiner

*Primary Examiner* — Binh Tieu

(57) ABSTRACT

A network traffic monitoring system detects an identity associated with a telephone call that enters a network and queries a first identity source list that includes entries representative of illegitimate identities and a second identity source list that includes entries representative of legitimate identities to determine whether the detected identity associated with the telephone call matches an entry included in the first identity source list or an entry included in the second identity source list. If the detected identity matches the entry included in the first identity source list, the network traffic monitoring system automatically determines that the detected identity is fake. If the detected identity matches the entry included in the second identity source list, the network traffic monitoring system analyzes one or more attributes of the telephone call other than the detected identity to determine whether the detected identity is fake.

24 Claims, 7 Drawing Sheets

METHODS AND SYSTEMS FOR DETERMINING WHETHER AN IDENTITY ASSOCIATED WITH A TELEPHONE CALL IS FAKE

BACKGROUND INFORMATION

Voice Over Internet Protocol ("VoIP") networks have significantly reduced the barrier of entry for using mass telephone calling applications such as auto-dialers, and these applications are increasingly available to users with bad intentions. Such mass telephone calling applications not only allows users to generate vast amounts of network traffic, but provide the flexibility to fake the identity of the traffic they are generating. This, coupled with the overall leniency and lack of controls of some VoIP service providers, has resulted in the increasing occurrence of identity misrepresentation and counterfeiting for fraudulent purposes.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
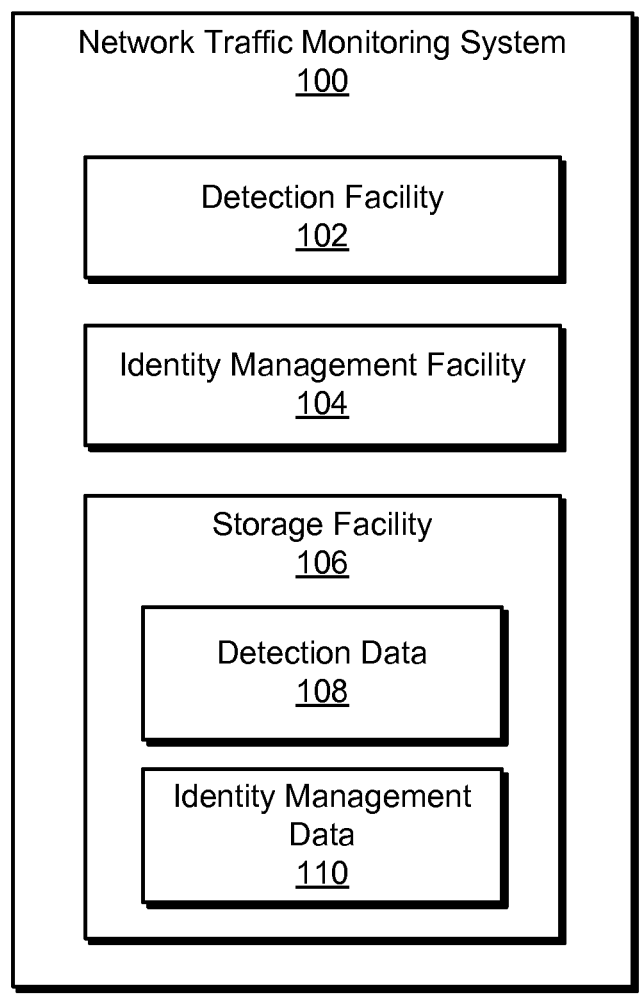
FIG. 1 illustrates an exemplary network traffic monitoring system according to principles described herein.

Methods and systems for determining whether an identity associated with a telephone call is fake are described herein. As will be described below, a network traffic monitoring system associated with a network may detect an identity associated with a telephone call that enters the network. The network traffic monitoring system may then query one or more identity source lists to determine whether the detected identity matches an entry included in any of the identity source lists. If there is a match, the network traffic monitoring system may perform one or more predetermined actions with respect to the detected identity and/or telephone call depending on the identity of the identity source list that includes the matching entry.

For example, the network traffic monitoring system may query a first identity source list that includes entries representative of illegitimate identities and a second identity source list that includes entries representative of legitimate identities to determine whether the detected identity associated with the telephone call matches an entry included in the first identity source list or an entry included in the second identity source list. As used herein, an "illegitimate identity" refers to an identity that should not be associated with a telephone call that enters a network. For example, an illegitimate identity may be representative of a disconnected or unassigned telephone number. A "legitimate identity" refers to an identity that may be legitimately associated with a telephone call that enters a network. For example, a legitimate identity may be representative of a telephone number that has been assigned to a customer of a telephone service provider.

If the querying determines that the detected identity associated with the telephone call matches an entry included in the first identity source list, the network traffic monitoring system may automatically determine that the detected identity associated with the telephone call is fake. Alternatively, if the querying determines that the detected identity associated with the telephone call matches an entry included in the second identity source list, the network traffic monitoring system may analyze one or more attributes of the telephone call other than the detected identity to determine whether the detected identity associated with the telephone call is fake. Such attributes will be described in more detail below.

If the network traffic monitoring system determines that the detected identity associated with the telephone call is fake, the network traffic monitoring system may perform one or more remedial actions. For example, the network traffic monitoring system may automatically block the telephone call and/or other telephone calls associated with the faked identity, alert (e.g., notify) one or more victims of the faked identity, reroute call backs to one or more victims of the faked identity, and/or take any other action as may serve a particular implementation.

Perpetrators of faked telephone call identities (also referred to herein as "bad actors") may have a variety of different motives. For example, the identity of a telephone call may be faked so that the telephone call looks legitimate on the called party's caller identification ("ID"). In this manner, it may be more likely for the called party to answer the call. However, if the called party tries to dial the number back, the call will not route (i.e., trace) back to the user who faked the identity of the telephone call. In some cases, identity misrepresentation may be used in a telephony denial-of-service ("T-DOS") attack in which telephone calls are constantly made to the same called number to prevent the owner of the called number from being able to call out. Additionally or alternatively, the identity of a victim (e.g., a business) may be used as the faked identity, thus making it look like the victim is making the call. When this happens, the victim may be flooded with call backs from angry and/or annoyed people who have been called by a perpetrator using the faked identity. This situation may be referred to as an indirect T-DOS attack. These examples encompass just a subset of schemes that could be perpetrated by faking telephone call identities.

The methods and systems described herein may be beneficial to end-users and providers of networks (e.g., VoIP networks) alike. For example, the methods and systems described herein may detect and mitigate problems associated with faked telephone call identities, thus protecting the identity, brand, and/or reputation of end-users (e.g., customers) of a network. The methods and systems described herein may also protect and prevent disruptive damage to network resources, reduce network administration costs, and enhance the reputation of network providers (e.g., carriers). Moreover, the methods and systems described herein may provide a framework to dynamically combat the actions of bad actors as they continually attempt to create different ways to fake telephone call identities.

FIG. 1 illustrates an exemplary network traffic monitoring system 100 ("system 100") configured to monitor for and detect one or more faked identities associated with telephone calls that enter a network. System 100 may be associated with (e.g., owned and/or managed by) a provider (e.g., a carrier) of the network (e.g., wireless telephone network and/or a VoIP network). Additionally or alternatively, system 100 may be associated with (e.g., owned and/or managed by) an entity not directly associated with the network (e.g., an entity, such as the Federal Communications Commission ("FCC") and/or any other third-party entity, that provides an industry-wide identity protection service).

Figure 2:
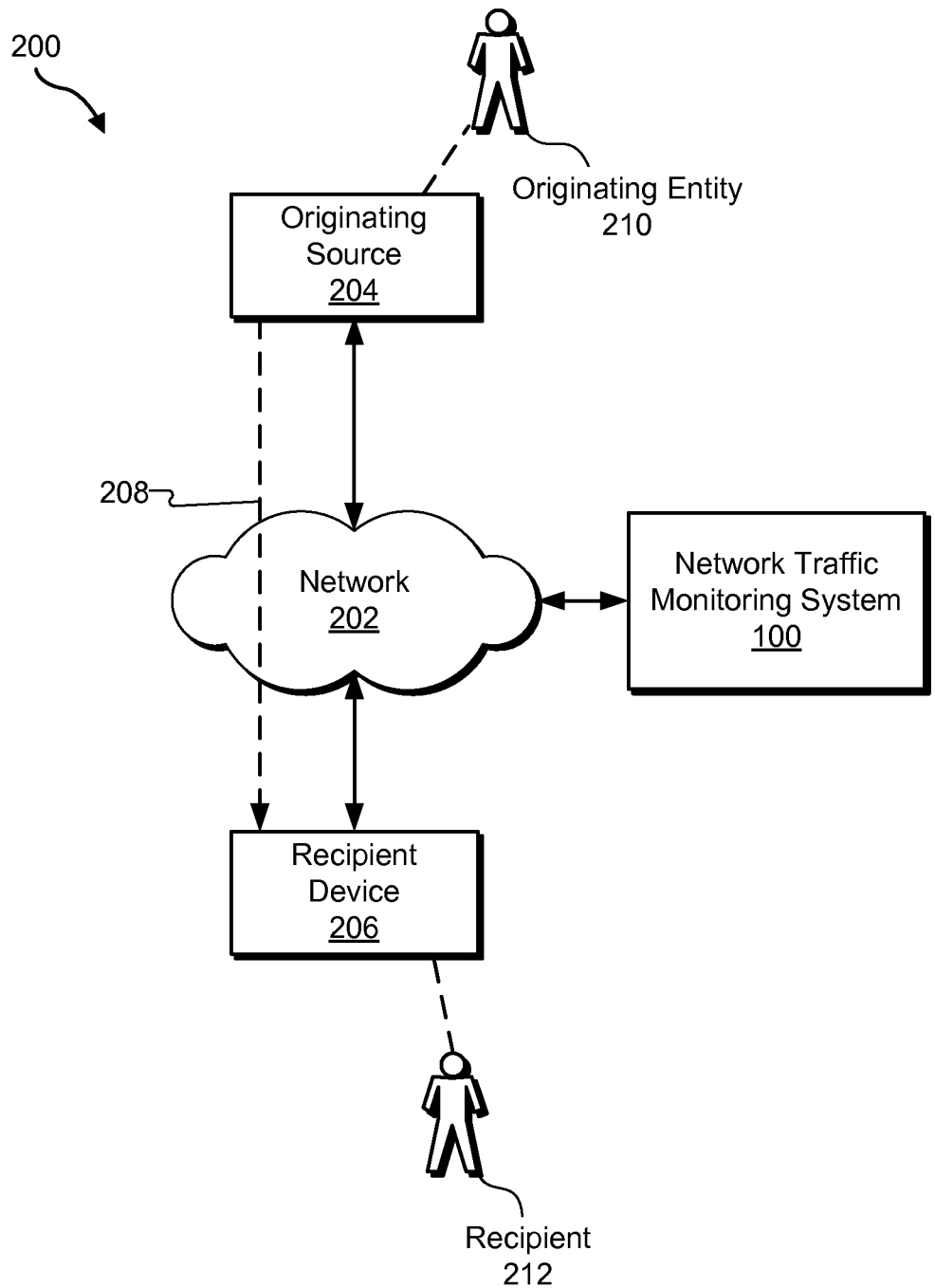
FIGS. 2-3 show exemplary environments in which the system of FIG. 1 may be used to monitor network traffic that enters a network according to principles described herein.

To facilitate an understanding of system 100, various environments in which system 100 may be employed will now be described. FIG. 2 illustrates an exemplary environment 200 in which system 100 is associated with a network 202. Network 202 may include one or more networks that carry traffic associated with telephone calls, such as one or more VoIP networks, telecommunication networks (e.g., time-division multiplexing ("TDM") networks), wireless networks (e.g., Wi-Fi networks), wireless communication networks, mobile telephone networks (e.g., cellular telephone networks), closed media networks, open media networks, wide area networks (e.g., the Internet), local area networks, and/or any other networks capable of carrying data representative of telephone calls. System 100 may be connected to network 202 in any suitable manner. For example, system 100 may be implemented by one or more components residing within network 202. Additionally or alternatively, system 100 may be external to network 202 and communicate with elements within network 202 by way of one or more network connections.

As shown, an originating source 204 and a recipient device 206 may each be connected to network 202. In this configuration, originating source 204 may initiate a telephone call 208 between originating source 204 and recipient device 206. As shown, the telephone call 208 (i.e., data associated with the telephone call 208) may enter network 202, which may route the telephone call 208 to recipient device 206.

Originating source 204 may include any combination of computing devices configured to originate one or more telephone calls. For example, originating source 204 may include an auto-dialer (e.g., a computing device that executes an auto-dialer application) configured to perform mass telephone calling operations (e.g., by automatically dialing multiple telephone numbers and, in response to answered calls, either playing a recorded message ("robo-calling") or connecting the answering party to a live person). Originating source 204 may additionally or alternatively include one or more telephones (e.g., one or more mobile telephones and/or a landline telephones) and/or any other computing device as may serve a particular implementation. In some examples, originating source 204 may be configured to fake an identity of one or more telephone calls originated by originating source 204.

Originating source 204 may be associated with (e.g., used by) an originating entity 210. Originating entity 210 may include one or more people and/or organizations. In some examples, originating entity 210 may include one or more bad actors—i.e., one or more people and/or organizations that purposefully fake or misrepresent an identity associated with telephone call 208 for any of the reasons described herein.

Recipient device 206 may include any combination of computing devices configured to receive one or more telephone calls. For example, recipient device 206 may include a telephone (e.g., a mobile telephone and/or a landline telephone). Recipient device 206 may be associated with (e.g., used by) a recipient 212. Recipient 212 may include one or more people and/or organizations (e.g., businesses). For example, recipient 212 may include a subscriber to a telephone service provided by a provider of network 202. In cases where telephone call 208 has a faked identity, recipient 212 may be intentionally or randomly targeted by originating entity 210.

Figure 3:
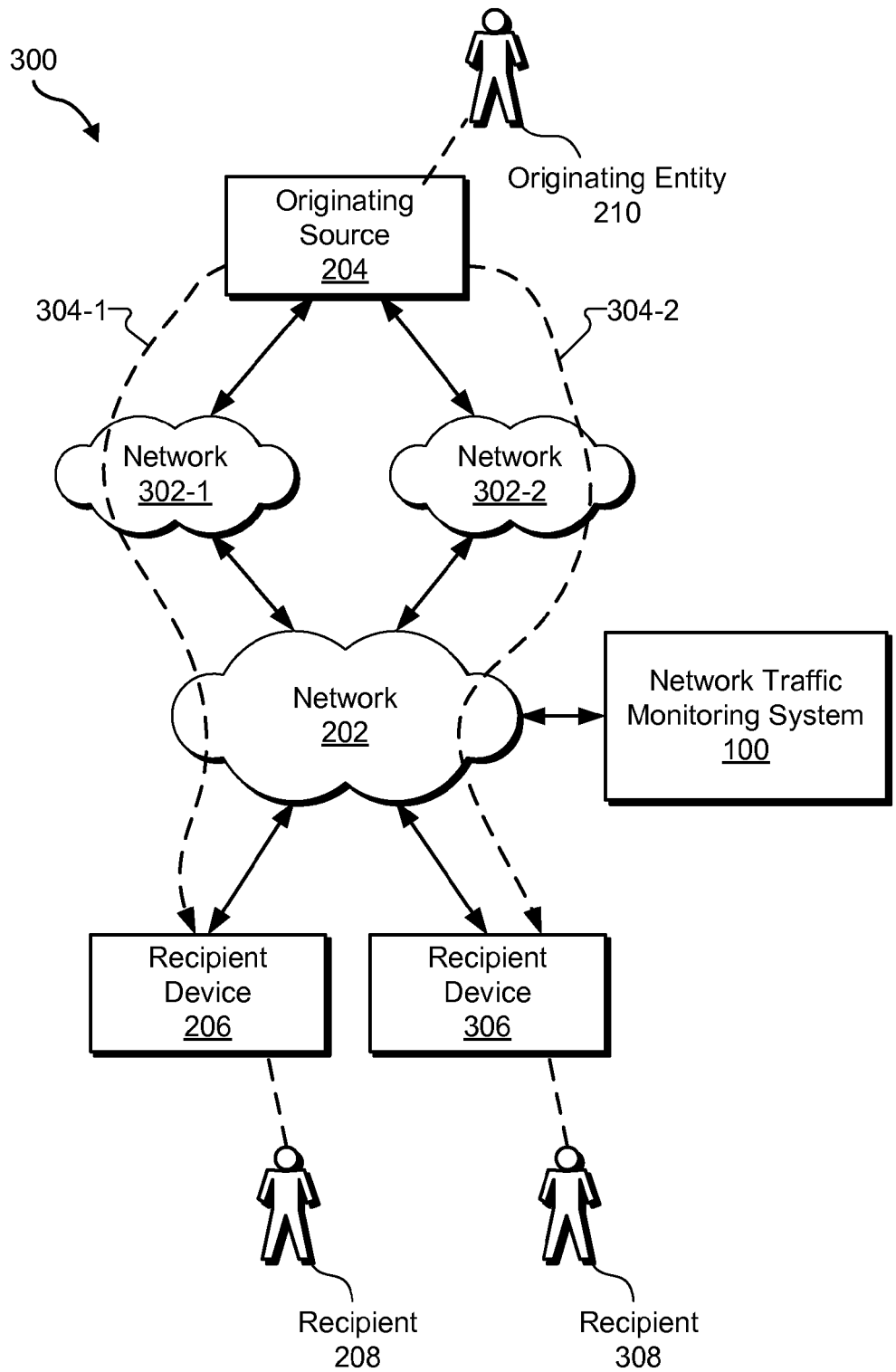

It will be recognized that a telephone call may be routed through multiple networks in order to connect originating source 204 and recipient device 206. To illustrate, FIG. 3 shows another exemplary environment 300 in which system 100 may be used to monitor network traffic that enters network 202. As shown, originating source 204 is connected directly to networks 302-1 and 302-2 (collectively "networks 302") instead of directly to network 202. In this scenario, originating entity 210 may be a subscriber to one or more services provided by one or more entities associated with networks 302.

Networks 302 may include any type of network described herein and, in some examples, may be associated with one or more entities separate from a provider of network 202. For example, networks 302 may be associated with (e.g., owned and/or managed by) one or more customers (e.g., carriers and/or wholesalers) of a provider of network 202.

In the configuration of FIG. 3, telephone calls originated by originating source 204 may be routed through different networks to different recipient devices. For example, as shown in FIG. 3, a first telephone call 304-1 originated by originating source 204 may be routed to recipient device 206 by way of network 302-1 and network 202. In contrast, a second telephone call 304-2 originated by originating source 204 may be routed to another recipient device 306 (which, as shown in FIG. 3 is associated with a recipient 308) by way of network 302-2 and network 202.

In the preceding examples, each of the networks 202, 302-1, and 302-2 may be an "originating network" for a particular telephone call. As used herein, an "originating network" for a telephone call refers to a network used by an originating source (e.g., originating source 204) to originate a telephone call. For example, in the example provided in FIG. 2, network 202 is the originating network for telephone call 208. However, in the example provided in FIG. 3, network 302-1 is the originating network for telephone call 304-1 and network 302-2 is the originating network for telephone call 304-2. It will be recognized that one or more intermediate networks may be positioned between originating networks 302 and network 202 as may serve a particular implementation.

Returning to FIG. 1, system 100 may include, without limitation, a detection facility 102, an identity management facility 104, and a storage facility 106 selectively and communicatively coupled to one another. It will be recognized that although facilities 102-106 are shown to be separate facilities in FIG. 1, any of facilities 102-106 may be combined into fewer facilities, such as into a single facility, or divided into more facilities as may serve a particular implementation. Additionally or alternatively, one or more of the facilities 102-106 may be omitted from and/or external to system 100 in other implementations. For example, storage facility 106 may be external of and communicatively coupled to system 100 in certain alternative implementations. Facilities 102-106 of system 100 may include or be otherwise implemented by one or more computing devices configured to perform one or more of the operations described herein. In such implementations, system 100 may be referred to as a computer-implemented system 100.

Storage facility 106 may store detection data 108 generated and/or used by detection facility 102 and identity management data 110 generated and/or used by identity management facility 104. Storage facility 106 may additionally or alternatively store any other type of data as may serve a particular implementation.

Data stored by storage facility 106 may be accessed by system 100 from any suitable source, including a source internal or external to system 100. Storage facility 106 may permanently or temporarily store data. In certain examples, system 100 may access certain data from a source external to system 100 and temporarily store the data in storage facility 106 for use by detection facility 102 and/or identity management facility 104. In certain examples, data generated by detection facility 102 and/or identity management facility 104 may be stored permanently or temporarily to storage facility 106.

Detection facility 102 may detect an identity associated with a telephone call that enters a network associated with system 100 (e.g., a network monitored by system 100). As used herein, an "identity" associated with a telephone call may refer to a telephone number associated with the telephone call, an IP address associated with the telephone call, an email address associated with the telephone call, a non-numeric identifier (e.g., a hash tag identifier) associated with the telephone call, an image (e.g., a photograph) associated with the telephone call, and/or any other suitable identifier associated with the telephone call as may serve a particular implementation. Moreover, the "telephone call" associated with the detected identity may include any type of telephone call. For example, the telephone call may include a VoIP telephone call.

Detection facility 102 may detect the identity associated with the telephone call that enters the network associated with system 100 in any suitable manner. For example, detection facility 102 may detect the identity associated with the telephone call that enters the network by scanning real-time network signaling data within the network as the telephone call is being performed and locating data representative of the identity associated with the telephone call within the real-time network signaling data. As used herein, "real-time network signaling data" refers to network traffic that is representative of telephone calls and that passes through the network as the telephone calls are made. Data included in the real-time network signaling data may include headers, fields, tags, and/or payloads that contain data representative of telephone call identities and/or information that may be used to determine an identity of a telephone call. For example, Table 1 lists various fields that may be included in real-time network signaling data and that may be used to determine an identity of a telephone call. The fields listed in Table 1 are associated with Session Initiated Protocol ("SIP"), SIP-I, SIP-T, ISUP, and H.323 protocols. However, it will be recognized that other fields associated with other communication protocols may alternatively be used to determine an identity associated with a telephone call.

TABLE 1

| Field Name | Description |
|---|---|
| P-Asserted-Identity or Remote-Party-ID | Information representative of calling party number or caller ID |
| Calling Name Identity (CNAME) | Information representative of display name |
| FROM | Information representative of display name or user provided identity |
| P-Charge-Info | Information representative of charge number or billing number |
| Diversion | Information representative of |

TABLE 1-continued

| Field Name | Description |
|---|---|
| | redirecting number |
| JIP, Orig, rn, Calling Party Category (CPC), Originating Line Information (OLI), or Info Digits (II) | Information representative of originating jurisdiction and mobile/roaming indication |

By analyzing real-time network signaling data associated with a telephone call as the telephone call is being made, system 100 may determine that an identity associated with the telephone call is fake and perform one or more remedial actions with respect to the telephone call in real-time (or near real-time) as the telephone call is being made and/or shortly thereafter.

Detection facility 102 may additionally or alternatively detect an identity associated with a telephone call that enters a network by locating data representative of the identity associated with the telephone call within call detail records associated with the network subsequent to the telephone call being performed. The call detail records may include billing records, usage records, and/or any other type of records that chronicle the use of a particular telephone call identity. The call detail records may be maintained in any suitable manner. Likewise, detection facility 102 may access the call detail records in any suitable manner.

Once the identity of a telephone call has been detected, identity management facility 104 may analyze the detected identity and/or the telephone call in accordance with a fake identity detection heuristic to determine whether the detected identity associated with the telephone call is fake. A detected identity associated with a telephone call that has been determined to be fake may be flagged by identity management facility 104 as at least potentially being fake such that one or more remedial follow-up actions may be performed with respect to the detected identity and/or telephone call. Hence, a determination that a detected identity is fake may or may not mean that the detected identity is, in actuality, fake.

Figure 4:
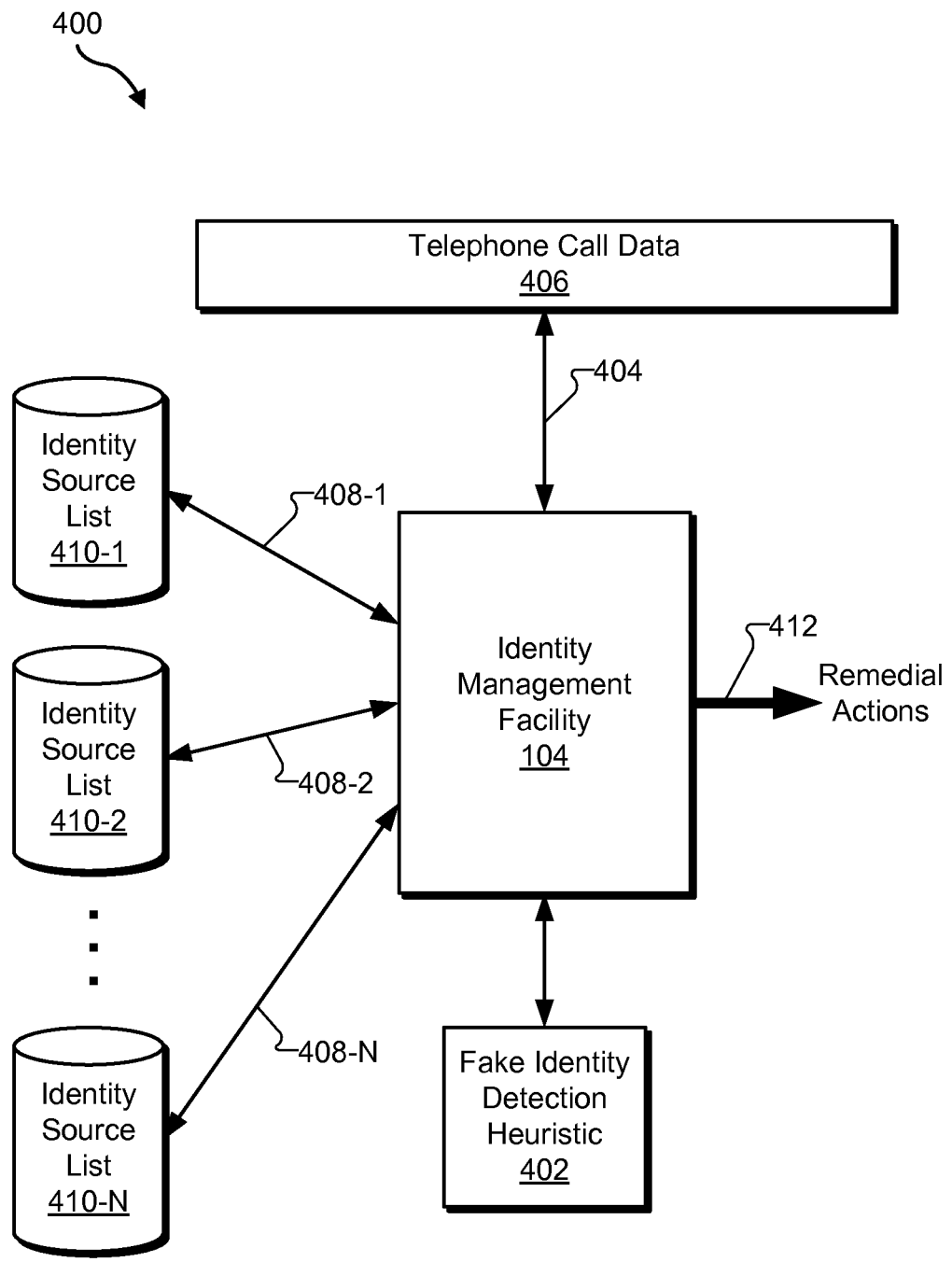
FIG. 4 shows an exemplary configuration in which an identity management facility analyzes a telephone call and/or its detected identity in accordance with a fake identity detection heuristic according to principles described herein.

FIG. 4 shows an exemplary configuration 400 in which identity management facility 104 analyzes a telephone call and/or its detected identity in accordance with a fake identity detection heuristic 402. As represented by arrow 404, identity management facility 104 may access (e.g., receive) telephone call data 406 (i.e., data representative of a telephone call and a detected identity associated with the telephone call).

As represented by arrows 408-1 through 408-N (collectively "arrows 408"), identity management facility 104 may query, in accordance with the fake identity detection heuristic 402, a plurality of different identity source lists 410 (e.g., identity source lists 410-1 through 410-N) to determine whether the detected identity associated with the telephone call matches an entry included in any of the identity source lists 410. As used herein, an "identity source list" refers to a list of entries representative of telephone call identities that share a common attribute. For example, a particular identity source list (e.g., identity source list 410-1) may include entries representative of illegitimate identities, which, as described above, should not be associated with a telephone call that enters a network. Examples of these types of identity source lists will be described in more detail below. Other identity source lists (e.g., identity source list 410-2) may include entries representative of legitimate identities. As described above, these legitimate identities may be legitimately associated with a telephone call that enters a network. Examples of these types of identity source lists will also be described in more detail below. Each identity source list may also specify one or more other attributes associated with each identity included therein. For example, an identity source list may specify a name of a user (e.g., subscriber) associated with an identity, normal business hours associated with a business associated with an identity, a geographic location of a user associated with an identity, a calling pattern associated with an identity, etc.

The identity source lists referred to herein may be maintained in any suitable manner. For example, one or more identity source lists may be maintained by system 100 within storage facility 106 (e.g., in the form of identity management data 110). Additionally or alternatively, one or more identity source lists may be maintained by a system and/or entity separate from system 100. The identity source lists may be maintained within any suitable data structure (e.g., within one or more databases). It will be recognized that an identity may include one or more equivalent versions of that identity. These may be specified together in the identity source lists, and may help to further identify any illicit use of a particular identity.

Various types of identity source lists that may be queried by identity management facility 104 in accordance with the fake identity detection heuristic 402 will now be described. It will be recognized that additional or alternative identity source lists to those described herein may be queried by identity management facility 104 as may serve a particular implementation. It will also be recognized that any of the identity source lists described herein may be static, dynamic, tunable, and/or based upon historical and/or real-time data sets as may serve a particular implementation.

In some examples, an identity source list that may be queried by identity management facility 104 may include entries representative of identities not assigned to any customer of one or more telephone service providers. For example, an identity source list may include a list of disconnected telephone numbers (referred to as a "DISCO list") and/or a list of unused telephone numbers. These numbers may be treated by identity management facility 104 as illegitimate identities because they should not be associated with telephone calls that enter a network associated with the one or more telephone service providers.

Another type of identity source list that may be queried by identity management facility 104 may include entries representative of identities designated as belonging to an inbound only telephone service. Such identities may be treated by identity management facility 104 as illegitimate identities because they should never be associated with telephone calls originated by an originating source.

Another type of identity source list that may be queried by identity management facility 104 may include a list of location routing numbers ("LRNs") used to support local number portability. These numbers may be assigned by a local exchange routing guide to local exchanges so that calls made to a ported number associated with a user will be routed to a new local exchange serving the user. Because LRNs are only used internally within a network (i.e., they are never assigned to end-users), they may be treated by identity management facility 104 as illegitimate identities.

Another type of identity source list that may be queried by identity management facility 104 may include a list of identities designated as being faked identities. For example, a particular telephone number may be identified in any of the ways described herein as being fake. In response, the telephone number may be added to a list of identities designated as being faked identities and treated by identity management facility 104 as being illegitimate.

Various identity source lists that include entries representative of legitimate identities and that may be queried by identity management facility 104 will now be described. For example, a first type of identity source list that includes legitimate entries and that may be queried by identity management facility 104 may include a list of identities managed by a particular carrier (e.g., a carrier that manages the network associated with system 100, a customer (e.g., a sub-carrier and/or wholesaler) of the carrier, etc.). For example, a carrier may maintain a list of telephone numbers that have been assigned to subscribers of a service provided by the carrier. The list may also specify other attributes associated with the telephone numbers (e.g., subscriber names and/or device IDs assigned to the telephone numbers). Because these numbers have been assigned to subscribers of the carrier, identity management facility 104 may treat the numbers as being legitimate. However, as will be described below, if a telephone number in this list is associated with a telephone call originated by a user and/or device other than a subscriber and/or device assigned to the telephone number, the telephone call may be flagged for further investigation with respect to whether the identity of the telephone call has been faked.

Another type of identity source list that includes legitimate entries and that may be queried by identity management facility 104 may include a list of identities flagged for tracking or investigation. These identities may be flagged for tracking or investigation for any reason (e.g., as a result of one or more fraud monitoring operations, customer assistance operations, etc.).

Another type of identity source list that includes legitimate entries and that may be queried by identity management facility 104 may include a list of identities designated by one or more direct marketing services as being ineffective call listings. Such a list may be referred to as a "market list" and may be used by telemarketers to not waste time dialing telephone numbers that are disconnected, unresponsive, included in do-not-call lists, assigned to payphones, associated with recently deceased subscribers, etc.

Another type of identity source list that includes legitimate entries and that may be queried by identity management facility 104 may include a list of identities flagged for monitoring by one or more identity monitoring services. For example, an identity monitoring service (e.g., LIFELOCK, etc.) may maintain a list of identities associated with customers of the identity monitoring service. These customers may be especially concerned about identity theft, for example. Hence, a carrier associated with a network may partner with the identity monitoring service to monitor for illicit use of the customers' identities with respect to telephone calls.

The above-described identity source lists are merely examples of the many different identity source lists that may be queried by identity management facility 104. One or more of the identity source lists may be maintained specifically for purposes of determining whether an identity associated with a telephone call is fake. Other identity source lists may be maintained for other purposes, but leveraged for use in connection with the systems and methods described herein.

In some examples, identity management facility 104 may normalize a detected identity before querying the identity source lists to determine whether the detected identity matches an entry included in the identity source lists. This is because the detected identity may be provided in a variety of different formats (e.g., with or without the SIP "+" E.164 designator, with or without the country code, etc.). The normalization may be performed in any suitable manner and may result in a normalized identity that matches the formatting used in the identity source lists.

In some examples, if identity management facility 104 determines that an identity associated with a telephone call that enters a network matches an entry included in an identity source list that includes entries representative of illegitimate identities, identity management facility 104 may automatically determine that the detected identity associated with the telephone call is fake. This determination may be done in any suitable manner. For example, identity management facility 104 may flag or otherwise mark the telephone call as having a fake identity.

Alternatively, if identity management facility 104 determines that an identity associated with a telephone call that enters a network matches an entry included in an identity source list that includes entries representative of legitimate identities, identity management facility 104 may analyze one or more attributes of the telephone call other than the detected identity to determine whether the detected identity associated with the telephone call is fake.

Identity management facility 104 may analyze the one or more attributes of the telephone call in any suitable manner. For example, identity management facility 104 may perform a plurality of different inquiries with respect to the identity source lists and/or any other data source and determine whether the detected identity associated with the telephone call is fake based on one or more results of the inquiries.

To illustrate, identity management facility 104 may perform one or more inquiries (e.g., by scanning network signaling data and/or accessing call detail records) to determine whether the detected entity associated with the telephone call is also associated with a volume of telephone calls that exceeds a predetermined threshold associated with the detected entity. If the detected identity is suddenly seen appearing in an unexpectedly high volume of calls, this could be a trigger that the identity is possibly fake. The predetermined threshold may be specified in any suitable manner. For example, the threshold may be automatically determined based on historical usage of the identity. Additionally or alternatively, the threshold may be manually specified, e.g., by a legitimate owner of the identity. In some examples, the threshold may be different for different times of day. For example, the threshold for a business may be higher during business hours than during non-business hours.

Additionally or alternatively, identity management facility 104 may perform one or more inquiries (e.g., by scanning network signaling data and/or accessing call detail records) to determine whether the telephone call deviates from an expected calling behavior associated with the detected entity. For example, a service plan and/or statistical calling pattern associated with the detected identity may indicate that telephone calls having the detected identity typically originate from a particular location (e.g., IP address and/or physical location) during a certain period of time (e.g., day-time hours) each day. Hence, if one or more telephone calls that have the detected identity deviate from the expected calling behavior, identity management facility 104 may determine that the detected identity is fake.

Additionally or alternatively, identity management facility 104 may perform one or more inquiries (e.g., by scanning network signaling data and/or accessing call detail records) to identify an originating network that originates the telephone call. In some cases, the detected identity of the telephone call should never originate within a particular network (e.g., a network associated with a particular carrier or wholesaler). For example, if the identity of a VoIP retail customer of a carrier is detected to be associated with bulk traffic originated within a wholesale VoIP customer origination network, identity management facility 104 may determine that the identity of the telephone calls is fake. As another example, identity management facility 104 may determine that the detected identity associated with the telephone call matches an entry included in a list of identities managed by a particular carrier. In this example, identity management facility 104 may identify an originating network that originates the telephone call, identify a carrier associated with the originating network, and determine whether the carrier associated with the originating network is the same as the particular carrier that manages the identities included in the second identity source list. If the carriers are different, identity management facility 104 may determine that the detected identity is fake and/or analyze one or more other attributes associated with the telephone call.

Additionally or alternatively, identity management facility 104 may perform one or more inquiries (e.g., by scanning network signaling data and/or accessing call detail records) to determine a time of day when the telephone call is placed. The determined time of day may be used in combination with the results of any of the other inquires described herein to determine whether the detected identity associated with the telephone call is fake. For example, a business may have normal business hours between 9:00 am and 5:00 pm. If identity management facility 104 determines that thousands of calls having the business's identity associated therewith are made at 2:00 am, identity management facility 104 may determine that the identity is fake. As another example, identity management facility 104 may determine that a plurality of telephone calls with the same identity are made at nearly the same time, that the telephone calls arrive via multiple sources (e.g., multiple carriers), and that the telephone calls are intended for multiple destinations. Such a scenario may cause identity management facility 104 to determine that the identity of the telephone calls is fake.

Additionally or alternatively, identity management facility 104 may perform one or more inquiries (e.g., by scanning network signaling data, accessing call detail records, accessing service contracts, etc.) to determine whether a display name (e.g., a caller ID) associated with the detected identity is assigned to the detected identity. For example, the detected identity may have an associated display name of "Mark Smith," but a service contract associated with the detected identity may indicate that a display name of "Bob Jones" is assigned to the detected identity. In this case, the difference between the display name and the name in the service contract may cause identity management facility 104 to determine that the identity of the telephone calls is fake.

In some examples, identity management facility 104 may determine that a detected identity associated with a telephone call matches an entry included in a list of identities designated by a direct marketing service as being ineffective call listings. In response, identity management facility 104 may further analyze the list in order to determine why the identity is included in the list. If the identity is included in the list because it is a disconnected number, for example, identity management facility 104 may determine that the detected identity is fake. However, other numbers on the list may be valid and in-service, including identities for "do not call me", "unresponsive" or "household with a recently deceased individual". These categories may require additional analysis, such as keeping track of the number of calls being seen with this identity and originations these calls are coming from to better determine suspicious usage. Such analysis may be performed by determining whether the identity appears in any other identity lists, scanning network signaling data for other instances of the identity, etc.

Based on the results of one or more of the above-described inquiries, identity management facility 104 may determine whether the detected identity associated with the telephone call is fake. It will be recognized that identity management facility 104 may make any other type of inquiry in order to determine whether the detected identity associated with the telephone call is fake.

As illustrated in FIG. 4 by arrow 412, if identity management facility 104 determines that the detected identity associated with the telephone call is fake, identity management facility 104 may perform one or more remedial actions with respect to the detected identity and/or telephone call.

For example, if identity management facility 104 determines that the detected identity associated with the telephone call is fake, identity management facility 104 may perform one or more actions to identify an originating source of the telephone call. For example, identity management facility 104 may identify one or more additional telephone calls that enter the network and that are associated with the detected identity, analyze one or more attributes associated with the one or more additional telephone calls, and identify, based on the analysis of the one or more additional telephone calls, the originating source of the telephone call.

To illustrate, identity management facility 104 may determine that a detected identity associated with a telephone call that enters a network associated with a carrier is fake. However, the telephone call may have entered the network by way of a first source network (e.g., an originating network or an intermediate network associated with a sub-carrier) that hides the identity of the originating source of the telephone call. Hence, identity management facility 104 may attempt to identify other instances of the faked identity arriving from other source and/or intermediate networks associated with other sub-carriers and/or wholesalers. These other networks may be more transparent than the first source network in that they provide more details with respect to the originating source of the telephone calls that have the detected identity. Hence, identity management facility 104 may identify the originating source of the telephone call that enters the network by way of the first source network by analyzing data associated with other telephone calls that enter the network by way of one or more other networks.

Once an originating source of a telephone call that has a faked identity is identified, identity management facility 104 may perform various remedial actions with respect to the originating source. For example, identity management facility 104 may notify providers of other networks of the originating source so that they may each take remedial action with respect to the originating source. Additionally or alternatively, identity management facility 104 may block network traffic generated by the originating source (e.g., by blocking telephone calls having the faked identity that are generated by the originating identity). It will be recognized that identity management facility 104 may take a variety of actions up to and including blocking of network traffic in accordance with accepted "best practices" as specified by one or more overseeing entities (e.g., the FCC). Because a bad actor often uses multiple faked identities in order to avoid looking suspicious, identity management facility 104 may also scan network signaling data for other telephone calls originated by the originating source and analyze the other telephone calls in order to determine whether they are also associated with faked identities.

Identity management facility 104 may additionally or alternatively identify an originating network associated with a telephone call having a faked identity and take one or more remedial actions with respect to the originating network. For example, a particular originating network may be an enabler, whether knowingly or not, for bad actors. Hence, identity management facility 104 may notify a provider of the originating network that telephone calls with faked identities are being made by way of the originating network, flag the originating network for additional scrutiny, and/or terminate a business relationship with the originating network if the originating network continues to facilitate the actions of the bad actor.

Identity management facility 104 may additionally or alternatively identify a targeted recipient (e.g., an individual, a business, a service, and/or a region) of a telephone call having a faked identity and perform one or more actions within respect to the targeted recipient.

For example, identity management facility 104 may detect that a faked identity is calling a business in high quantity and velocity and accordingly determine that a direct T-DOS attack is in progress. In response, identity management facility 104 may notify the business (e.g., by way of an email, on-line notification, etc.). The notification may indicate, for example, that identity management facility 104 is aware of and taking one or more preventative actions with respect to the T-DOS attack. Additionally or alternatively, identity management facility 104 may perform one or more actions that allow the business to continue making and receiving valid telephone calls as the direct T-DOS attack is in progress. For example, identity management facility 104 may block telephone calls having the detected identity from reaching the business. Additionally or alternatively, in cases where the perpetrator is using many different faked identities to carry out the T-DOS attack, identity management facility 104 may temporarily reroute telephone calls directed at the business and screen each call before it is allowed to reach the business. This screening may continue until the T-DOS attack subsides and/or until the originating source of the T-DOS attack can be shut down.

As another example, identity management facility 104 may determine that an indirect T-DOS attack with respect to a targeted victim is in progress. This may be determined in any suitable manner. For example, identity management facility 104 may detect that a business suddenly receives an unusual increase in telephone calls. Identity management facility 104 may also determine (e.g., by way of a customer support interface with the business) that the telephone calls are coming from individuals who have indicated that the business called them first. In response, identity management facility 104 may determine that an indirect T-DOS attack is in progress and may perform one or more remedial actions with respect to the indirect T-DOS attack. For example, identity management facility 104 may temporarily reroute telephone calls directed at the business and screen each call before it is allowed to reach the business.

In some examples, identity management facility 104 may be configured to protect against illicit creation of charge and/or forwarding identities by a provider associated with an intermediate network (i.e., a network that routes network traffic to the network associated with identity management facility 104). This illicit creation of charge and/or forwarding identities may be configured to carry out fraudulent arbitration plays and/or collude with originating sources to keep their identity abstracted behind the additional levels of call diversion and/or forwarding.

To illustrate, for a faked identity appearing in a Diversion/History and/or P-Charge-Info/Charge Number header(s), an additional check may be performed by identity management facility 104 to verify that the forwarding carrier actually owns the identity. If the forwarding carrier does not actually own the identity, the identity may be flagged by identity management facility 104 as potentially being fake.

As another example, identity management facility 104 may analyze the percentage of traffic being forwarded by the intermediate network. Moderate to heavy appearance of diverted/ forwarded traffic should raise concern that an arbitration play and/or a service cost avoidance scheme is going on. For example, every call could be redirected using faked redirecting/charging identities to make it look like every call dialed through the intermediate network was dialed locally. If identity management facility 104 determines that the percentage of traffic being forwarded by the intermediate network is above a predetermined threshold, identity management facility 104 may initiate an investigation into the intermediate network to determine whether the intermediate network provider is colluding with bad actors and/or avoiding service costs by making traffic appear to originate in a different location than it actually does.

In some examples, identity management facility 104 may generate reports with respect to one or more identities determined to be fake. These reports may be updated in near real-time as faked identities are detected and may be customizable by one or more end-users (e.g., personnel associated with identity management facility 104).

Figure 5:
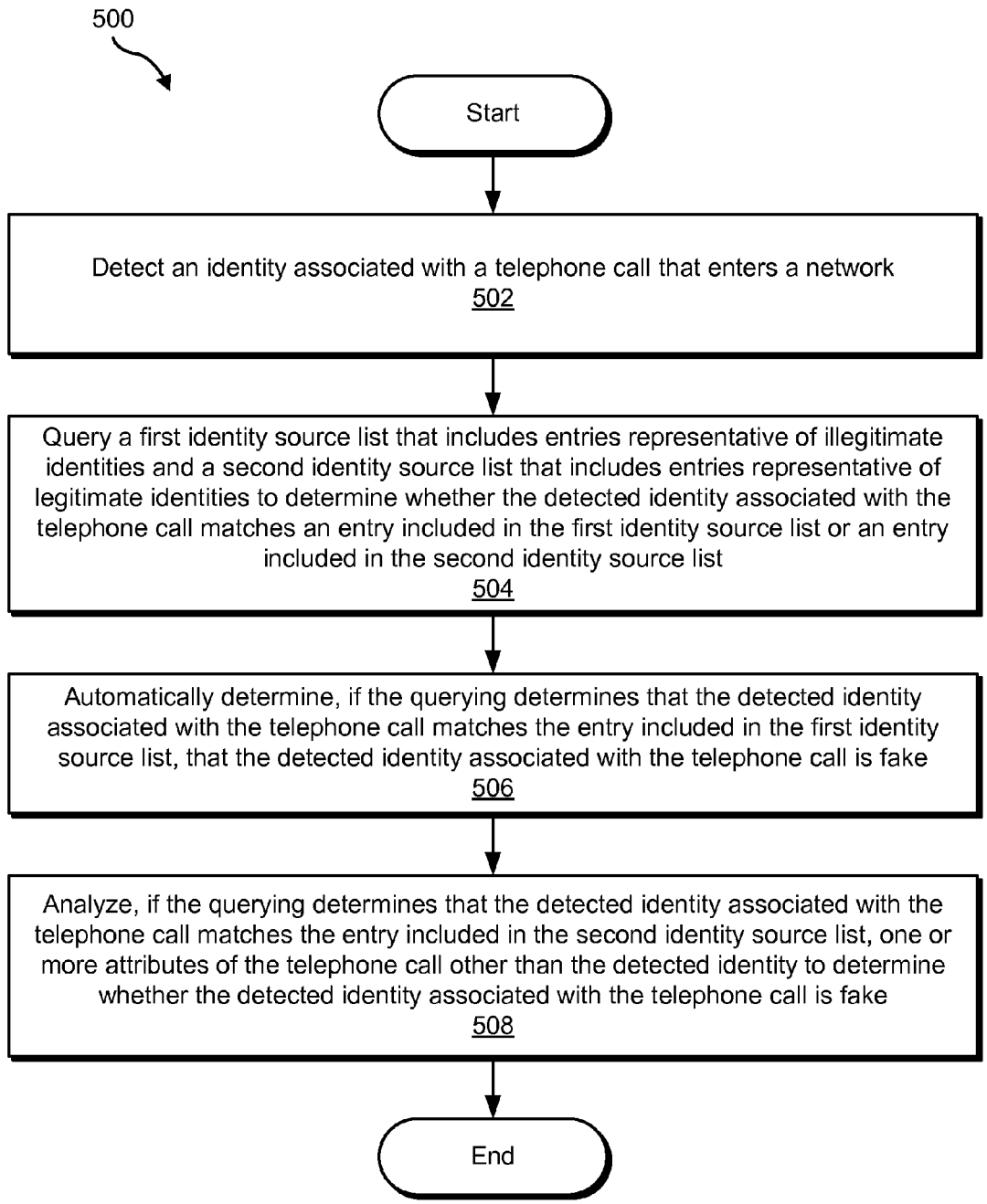
FIG. 5 illustrates an exemplary method of determining whether an identity associated with a telephone call is fake according to principles described herein.

FIG. 5 illustrates an exemplary method 500 of determining whether an identity associated with a telephone call is fake. While FIG. 5 illustrates exemplary steps according to one embodiment, other embodiments may omit, add to, reorder, and/or modify any of the steps shown in FIG. 5. One or more of the steps shown in FIG. 5 may be performed by system 100 and/or any implementation thereof.

In step 502, a network traffic monitoring system detects an identity associated with a telephone call that enters a network. Step 502 may be performed in any of the ways described herein.

In step 504, the network traffic monitoring system queries a first identity source list that includes entries representative of illegitimate identities and a second identity source list that includes entries representative of legitimate identities to determine whether the detected identity associated with the telephone call matches an entry included in the first identity source list or an entry included in the second identity source list. Step 504 may be performed in any of the ways described herein.

If the querying performed in step 504 determines that the detected identity associated with the telephone call matches the entry included in the first identity source list, the network traffic monitoring system automatically determines that the detected identity associated with the telephone call is fake (step 506). Alternatively, if the querying performed in step 504 determines that the detected identity associated with the telephone call matches the entry included in the second identity source list, the network traffic monitoring system analyzes one or more attributes of the telephone call other than the detected identity to determine whether the detected identity associated with the telephone call is fake (step 508). Steps 506-508 may be performed in any of the ways described herein.

In some alternative embodiments, if the network traffic monitoring system determines that the telephone call matches the entry included in the first identity source list and thereby automatically determines that the detected identity associated with the telephone call is fake, the network traffic monitoring system may abstain from querying the second identity source list.

Figure 6:
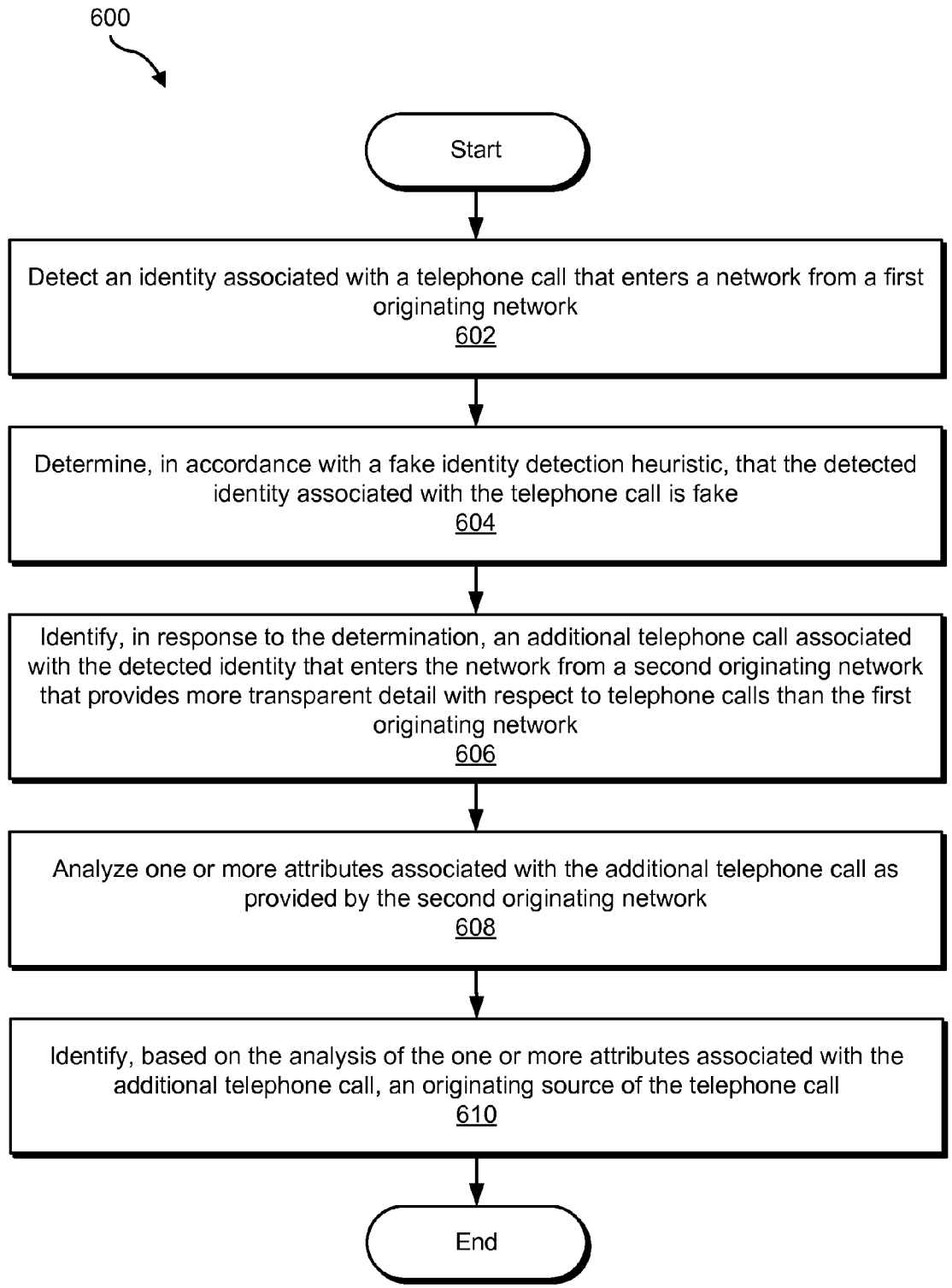
FIG. 6 illustrates an exemplary method of identifying an originating source of a telephone call that has a faked identity according to principles described herein.

FIG. 6 illustrates an exemplary method 600 of identifying an originating source of a telephone call that has a faked identity. While FIG. 6 illustrates exemplary steps according to one embodiment, other embodiments may omit, add to, reorder, and/or modify any of the steps shown in FIG. 6. One or more of the steps shown in FIG. 6 may be performed by system 100 and/or any implementation thereof.

In step 602, a network traffic monitoring system detects an identity associated with a telephone call that enters a network from a first originating network. Step 602 may be performed in any of the ways described herein.

In step 604, the network traffic monitoring system determines, in accordance with a fake identity detection heuristic, that the detected identity associated with the telephone call is fake. Step 604 may be performed in any of the ways described herein.

In step 606, the network traffic monitoring system identifies, in response to the determination, an additional telephone call associated with the detected identity that enters the network from a second originating network that provides more transparent detail with respect to telephone calls than the first originating network. Step 606 may be performed in any of the ways described herein.

In step 608, the network traffic monitoring system analyzes one or more attributes associated with the additional telephone call as provided by the second originating network. Step 608 may be performed in any of the ways described herein.

In step 610, the network traffic monitoring system identifies, based on the analysis of the one or more attributes associated with the additional telephone call, an originating source of the telephone call. Step 610 may be performed in any of the ways described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 7:
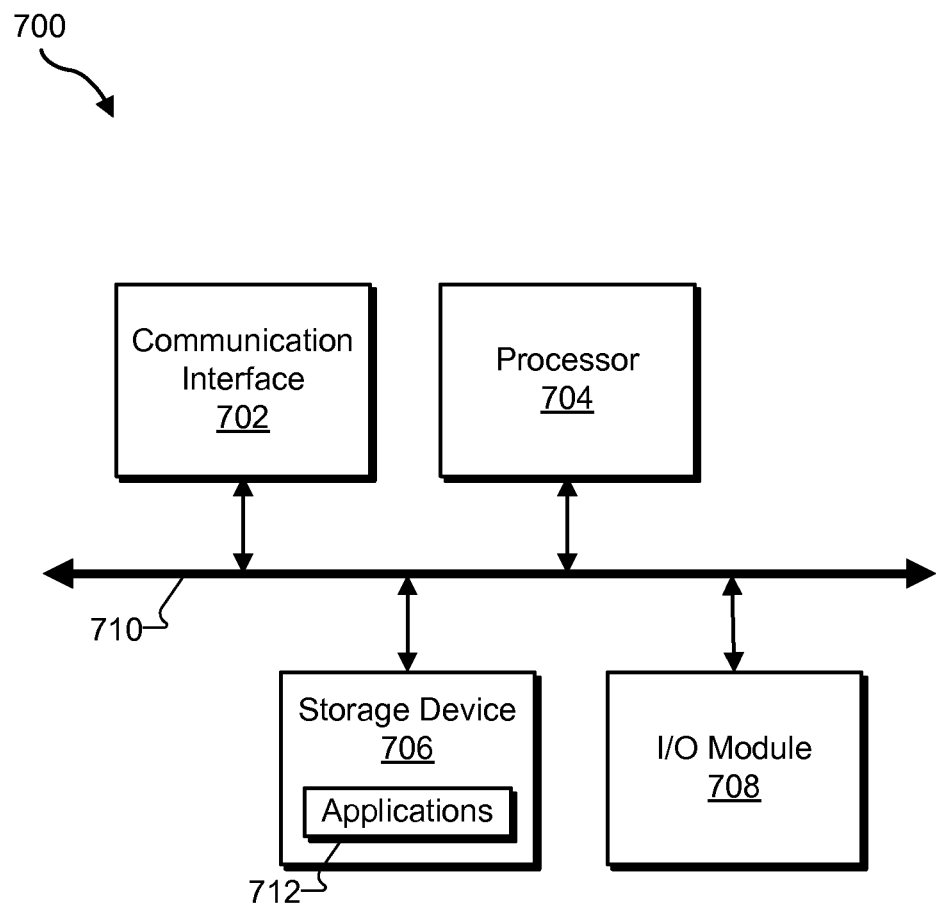
FIG. 7 illustrates an exemplary computing device according to principles described herein.

FIG. 7 illustrates an exemplary computing device 700 that may be configured to perform one or more of the processes described herein. As shown in FIG. 7, computing device 700 may include a communication interface 702, a processor 704, a storage device 706, and an input/output ("I/O") module 708 communicatively connected via a communication infrastructure 710. While an exemplary computing device 700 is shown in FIG. 7, the components illustrated in FIG. 7 are not intended to be limiting. Additional or alternative components may be used in other embodiments. Components of computing device 700 shown in FIG. 7 will now be described in additional detail.

Communication interface 702 may be configured to communicate with one or more computing devices. Examples of communication interface 702 include, without limitation, a wired network interface (such as a network interface card), a wireless network interface (such as a wireless network interface card), a modem, an audio/video connection, and any other suitable interface.

Processor 704 generally represents any type or form of processing unit capable of processing data or interpreting, executing, and/or directing execution of one or more of the instructions, processes, and/or operations described herein. Processor 704 may direct execution of operations in accordance with one or more applications 712 or other computer-executable instructions such as may be stored in storage device 706 or another computer-readable medium.

Storage device 706 may include one or more data storage media, devices, or configurations and may employ any type, form, and combination of data storage media and/or device. For example, storage device 706 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 706. For example, data representative of one or more executable applications 712 configured to direct processor 704 to perform any of the operations described herein may be stored within storage device 706. In some examples, data may be arranged in one or more databases residing within storage device 706.

I/O module 708 may be configured to receive user input and provide user output and may include any hardware, firmware, software, or combination thereof supportive of input and output capabilities. For example, I/O module 708 may include hardware and/or software for capturing user input, including, but not limited to, a keyboard or keypad, a touch screen component (e.g., touch screen display), a receiver (e.g., an RF or infrared receiver), and/or one or more input buttons.

I/O module 708 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 708 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 700. For example, one or more applications 712 residing within storage device 706 may be configured to direct processor 704 to perform one or more processes or functions associated with detection facility 102 and/or identity management facility 104. Likewise, storage facility 106 may be implemented by or within storage device 706.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   detecting, by a network traffic monitoring system associated with a network, an identity associated with a telephone call that enters the network;
   querying, by the network traffic monitoring system, a first identity source list that includes entries representative of illegitimate identities and a second identity source list that includes entries representative of legitimate identities to determine whether the detected identity associated with the telephone call matches an entry included in the first identity source list or an entry included in the second identity source list;
   automatically determining, by the network traffic monitoring system if the querying determines that the detected identity associated with the telephone call matches the entry included in the first identity source list, that the detected identity associated with the telephone call is fake; and
   analyzing, by the network traffic monitoring system if the querying determines that the detected identity associated with the telephone call matches the entry included in the second identity source list, one or more attributes of the telephone call other than the detected identity to determine whether the detected identity associated with the telephone call is fake.

2. The method of claim 1, wherein the detecting of the identity associated with the telephone call comprises:
   scanning real-time network signaling data associated with the network as the telephone call is being performed; and
   locating data representative of the identity within the telephone call within the real-time network signaling data.

3. The method of claim 1, wherein the detecting of the identity associated with the telephone call comprises locating data representative of the identity associated with the telephone call within call detail records associated with the network subsequent to the telephone call being performed.

4. The method of claim 1, wherein the first identity source list comprises a list of identities not assigned to any customer of a telephone service provider.

5. The method of claim 1, wherein the first identity source list comprises a list of identities designated as belonging to an inbound only telephone service.

6. The method of claim 1, wherein the first identity source list comprises a list of location routing numbers used to support local number portability.

7. The method of claim 1, wherein the first identity source list comprises a list of identities designated as being faked identities.

8. The method of claim 1, wherein the second identity source list comprises a list of identities managed by a particular carrier.

9. The method of claim 8, wherein the querying determines that the detected identity associated with the telephone call matches the entry included in the second identity source list, and wherein the analyzing of the one or more attributes of the telephone call comprises:
- identifying an originating network that originates the telephone call;
- identifying a carrier associated with the originating network; and
- determining whether the carrier associated with the originating network is the same as the particular carrier that manages the identities included in the second identity source list.

10. The method of claim 1, wherein the second identity source list comprises at least one of a list of identities flagged for tracking or investigation, a list of identities designated by one or more direct marketing services as being ineffective call listings, and a list of identities flagged for monitoring by one or more identity monitoring services.

11. The method of claim 1, wherein the querying determines that the detected identity associated with the telephone call matches the entry included in the second identity source list, and wherein the analyzing of the one or more attributes of the telephone call comprises performing at least one of:
- a first inquiry to determine whether the detected entity associated with the telephone call is also associated with a volume of telephone calls that exceeds a predetermined threshold associated with the detected entity;
- a second inquiry to determine whether the telephone call deviates from an expected calling behavior associated with the detected entity;
- a third inquiry to determine a time of day when the telephone call is placed;
- a fourth inquiry to identify an originating network that originates the telephone call;
- a fifth inquiry to identify another attribute of the telephone call as indicated in the second identity source list; and
- a sixth inquiry to determine whether a display name associated with the detected identity is assigned to the detected identity.

12. The method of claim 11, further comprising determining, by the network traffic monitoring system based on one or more results of one or more of the inquiries, that the detected identity associated with the telephone call is fake.

13. The method of claim 1, wherein if the detected identity associated with the telephone call is determined to be fake, the method further comprises performing one or more actions to identify an originating source of the telephone call.

14. The method of claim 13, wherein the performing of the one or more actions to identify the originating source of the telephone call comprises:
- identifying one or more additional telephone calls associated with the detected identity;
- analyzing one or more attributes associated with the one or more additional telephone calls; and
- identifying, based on the analyzing of the one or more attributes associated with the one or more additional telephone calls, the originating source of the telephone call.

15. The method of claim 14, further comprising identifying, by the network traffic monitoring system, one or more additional faked identities used by the originating source of the telephone call.

16. The method of claim 1, wherein if the detected identity associated with the telephone call is determined to be fake, the method further comprises blocking, by the network traffic monitoring system, one or more telephone calls associated with the detected identity.

17. The method of claim 1, wherein if the detected identity associated with the telephone call is determined to be fake, the method further comprises:
- identifying, by the network traffic monitoring system, a targeted recipient of the telephone call; and
- performing, by the network traffic monitoring system, one or more actions with respect to the targeted recipient.

18. The method of claim 17, wherein the one or more one or more actions with respect to the targeted recipient comprise at least one of notifying the targeted recipient that the detected identity is fake and temporarily rerouting telephone calls directed at the targeted recipient.

19. The method of claim 1, wherein at least one of the first identity source list and the second identity source list is maintained by an entity independent of the network.

20. The method of claim 1, further comprising normalizing, by the network traffic monitoring system, the detected identity before performing the querying.

21. The method of claim 1, embodied as computer-executable instructions on at least one non-transitory computer-readable medium.

22. A method comprising:
- detecting, by a network traffic monitoring system associated with a network, an identity associated with a telephone call that enters the network from a first originating network;
- determining, by the network traffic monitoring system in accordance with a fake identity detection heuristic, that the detected identity associated with the telephone call is fake;
- identifying, by the network traffic monitoring system in response to the determining, an additional telephone call associated with the detected identity that enters the network from a second originating network that provides more transparent detail with respect to telephone calls than the first originating network;
- analyzing, by the network traffic monitoring system, one or more attributes associated with the additional telephone call as provided by the second originating network; and
- identifying, by the network traffic monitoring system based on the analyzing of the one or more attributes associated with the additional telephone call, an originating source of the telephone call.

23. The method of claim 22, embodied as computer-executable instructions on at least one non-transitory computer-readable medium.

24. A system comprising:
at least one computing device that:
- detects an identity associated with a telephone call that enters a network;
- queries a first identity source list that includes entries representative of illegitimate identities and a second identity source list that includes entries representative of legitimate identities to determine whether the detected identity associated with the telephone call matches an entry included in the first identity source list or an entry included in the second identity source list;
- automatically determines, if the querying determines that the detected identity associated with the telephone call matches the entry included in the first identity source list, that the detected identity associated with the telephone call is fake; and analyzing, if the querying determines that the detected identity associated with the telephone call matches the entry included in the second identity source list, one or more attributes of the telephone call other than the detected identity to determine whether the detected identity associated with the telephone call is fake.

* * * * *